United States Patent [19]

Hernandez

[11] Patent Number: 5,511,422
[45] Date of Patent: Apr. 30, 1996

[54] METHOD AND APPARATUS FOR ANALYZING AND DETECTING FAULTS IN BEARINGS AND OTHER ROTATING COMPONENTS THAT SLIP

[75] Inventor: Walter C. Hernandez, Falls Church, Va.

[73] Assignee: Monitoring Technology Corporation, Fairfax, Va.

[21] Appl. No.: 45,604

[22] Filed: Apr. 9, 1993

[51] Int. Cl.$^6$ .................. G01M 13/02; G01M 13/04; G01N 29/12

[52] U.S. Cl. .................. 73/593; 73/659; 73/660; 364/508; 364/576

[58] Field of Search ............ 73/593, 660, 587, 73/659; 364/508, 507, 506, 576

[56] References Cited

U.S. PATENT DOCUMENTS

| | | |
|---|---|---|
| 3,699,806 | 10/1972 | Weichbrodt . |
| 3,842,663 | 10/1974 | Harting et al. . |
| 3,857,279 | 12/1974 | Salzer et al. . |
| 3,971,249 | 7/1976 | Bachofer . |
| 4,237,454 | 12/1980 | Meyer . |
| 4,287,581 | 9/1981 | Neale, Sr. . |
| 4,488,240 | 12/1984 | Kapadia et al. ............ 364/508 |
| 4,615,216 | 10/1986 | Vykoupil ................... 73/593 |
| 4,790,190 | 12/1988 | Bambara et al. . |
| 4,884,449 | 12/1989 | Nishimoto et al. . |
| 4,931,949 | 6/1990 | Hernandez et al. ......... 364/508 |
| 5,109,700 | 5/1992 | Hicho ...................... 73/660 |
| 5,365,787 | 11/1994 | Hernandez et al. ......... 73/660 |

FOREIGN PATENT DOCUMENTS

| | | |
|---|---|---|
| 4032299 | 4/1992 | Germany . |
| 2203221 | 8/1990 | Japan . |
| 2218928 | 8/1990 | Japan . |
| 2222818 | 9/1990 | Japan . |
| 3-2633 | 1/1991 | Japan . |
| 1401290 | 6/1988 | U.S.S.R. . |

OTHER PUBLICATIONS

"Low Frequency Vibration Generaged By Gear Tooth Impacts" by P. D. McFadden, *NDT International*, vol. 18 No. 5, Oct. 1985.

"How to Track Rolling Element Bearing Health with Vibration Signature Analysis" by James E. Berry, Sounds and Vibrations, 1993.

Primary Examiner—Hezron E. Williams
Assistant Examiner—Rose M. Finley
Attorney, Agent, or Firm—Richard C. Woodbridge

[57] ABSTRACT

The present invention provides a method and system for analyzing signals from rotating machines containing rotating components that slip and, thereby, to detect faults in those components. The signals are processed by a series of steps to generate coherently averaged spectra and derived features that indicate defects in, or certain other features of, machine components that slip or rotate asynchronously.

43 Claims, 7 Drawing Sheets

METHOD AND APPARATUS FOR ANALYZING AND DETECTING FAULTS IN BEARINGS AND OTHER ROTATING COMPONENTS THAT SLIP

BACKGROUND OF THE INVENTION

1. Technical Field

This invention relates to a signal processing method and apparatus for detecting faults and other features of rotating components that slip in rotating machinery. In particular, it relates to a method and apparatus that employs shaft encoders to average synchronously and to isolate signals arising from these asynchronously rotating components.

2. Background

Rolling-element bearings ("roller bearings") are manufactured in greater numbers than any other precision machine component and their failure is the most common cause of machine breakdown. The ability to detect the onset of breakdown of the elements of a roller bearing, such as the onset of pitting or cracks in the bearing races or rolling elements is fundamental to practicing predictive maintenance on machinery and avoiding catastrophic machine failure.

Roller bearings, other anti-friction bearings, belt-pulley assemblies and various other machine components are known to experience rotational slip in ordinary operation. The rotors of AC induction motors may also be considered to slip relative to their rotating electromagnetic fields. Oil whirl and oil whip can be considered as slipping shaft motions relative to the shaft rotation in journal bearings. Fluid circulation about the rotating shaft in a journal bearing or mechanical seal can be considered as a rotating component slipping relative to the shaft motion.

Vibration-signal-processing methods, including power spectral techniques, have been used to analyze the operation of some of these slipping components. For anti-friction bearings, the presence of large spectral components at the (1) inner-race ball passing frequency, (2) outer-race ball passing frequency, (3) ball-spin frequency and (4) cage-rotation frequency, as well as the higher harmonics of each of these components, tend to indicate the existence of faults in the associated bearing components. However, these signals are difficult to distinguish from background noise. When faults are present, frequency components commonly exist that correspond to modulations, sidebands, or interactions between the foregoing slipping components and various shaft-rotation frequency harmonics. However, these modulations or sidebands generally have not been utilized in the spectral analysis of bearings.

Other methods, which examine impulsive excursions in the time signal or measure the amplitudes of higher frequency bands, e.g. shock pulses, stress waves and spike energy, are in use as well. However, all of these methods are adversely effected by background noise and can be difficult to implement in the presence of numerous interfering narrow-band noise components in the spectra. Also the false alarms generated by such methods due to the persistence of background noise is a strong deterrent to sales of predictive maintenance equipment.

A signal processing method called "shaft-synchronous averaging" has been used to analyze gear vibration and detect gear faults (Hernandez, et. al., Weichbrodt, McFadden). This method is based on the fact that gears are rigidly coupled to their associated shafts, and to each other by the intermeshing of their teeth. Because of the fixed rotational relationships of the elements in a gear machine, signals associated with their rotation, such as vibration, can be averaged synchronously, i.e. by super-position of the signals in fixed relationship to the angular orientation of one element of the assembly, such as a gear-driven shaft. For large numbers of data sets, this synchronous-averaging gear method produces spectra reflecting only those vibrations synchronous with gear rotation, and not such asynchronous vibrations as from bearings and other components that slip. It should be noted that for a machine containing synchronously rotating components, the simple subtraction of consecutive data records before signal conditioning and processing eliminates most of the synchronous signals, such as shaft harmonics. For the case of a complex gearbox all gear mesh and shaft generated signals can be eliminated by subtracting data records that are separated by an integer multiple of the hunting tooth cycle, the hunting tooth cycle being defined as the time required for all gears and shafts of interest to rotate to their initial angular orientation.

It is believed that no signal-processing technique has previously been reported for use with machine components that slip that is comparable in fault-detection capability to the known gear techniques described above. The current invention, however, achieves that goal. It embodies new techniques and a device to monitor rotating machines with rotating components that slip as a means to detect faults, and to forecast and prevent catastrophic machinery breakdown.

SUMMARY OF THE INVENTION

The invention comprises a method and apparatus for detecting faults in slipping machine components, e.g. rolling-element bearings, by synchronously averaging and further-processing asynchronous signals emanating from machines. The method processes signals from a sensor, e.g. an accelerometer fixed or focused on a machine of interest, and from an encoder detecting the rotation of a component of the machine. The sensor and encoder signals are sent through interface circuits to, respectively, an analog signal conditioner and an encoder pulse-multiplier. The encoder pulse train is multiplied or divided to produce a new pulse train with a fixed number of pulses per encoder rotation, consistent with the Nyquist criterion on sampling frequency. The sensor signal is forwarded to an analog signal conditioner that conditions and forwards the signal to a processor or computer stage. The computer digitizes and samples the signal, using the pulse-multiplied encoder signal as an external clock. By this, the computer generates data records of fixed length, which then are processed by the computer. Processing of the data records begins with a Discrete Fourier Transformation (DFT). The components of the DFT, or its complex conjugates, then are used to calculate a new spectral function, G(I), which may be a 2-form or a higher order function of various forms. For a 2-form function, each element of G(I) is the product of two DFT spectral components or their complex conjugates, the sum (or difference) of whose frequencies is equal to some fixed harmonic of shaft rotation. G(I) is averaged over a large number of data records to produce <G(I)>. Likewise, a 3-form would be the product of three spectral components. Higher forms would be formed accordingly. Certain spectral components, such as for the rolling elements, will add constructively. Background noise, however, will add destructively and tend towards zero. The result is the emergence of spectral lines associated with specific machine components that slip. These spectral lines or their relationships are used to determine the condition of the machine, and a number of its other attributes.

These, in turn, are the basis for alarms or other messages generated by the computer.

An important advantage of this invention is that it generalizes synchronous signal-averaging techniques, enabling their application to bearings and other components that slip in a manner that detects component defects even in the presence of high levels of background noise. Used in conjunction with gear monitoring techniques of Hernandez et al., this technique enables the detection of faults in complex rotating machines composed of both components that rotate synchronously and ones that slip. By utilizing higher order and other forms of G, it is possible to examine interactions between, even indirectly coupled, asynchronously rotating components, such as two bearings coupled via a meshing gear pair, a powerful tool in monitoring the complex machinery being introduced in advanced applications.

DETAILED DESCRIPTION OF THE INVENTION

During the course of this description like numbers will be used to identify like elements according to the different figures that illustrate the invention.

Figure 1:
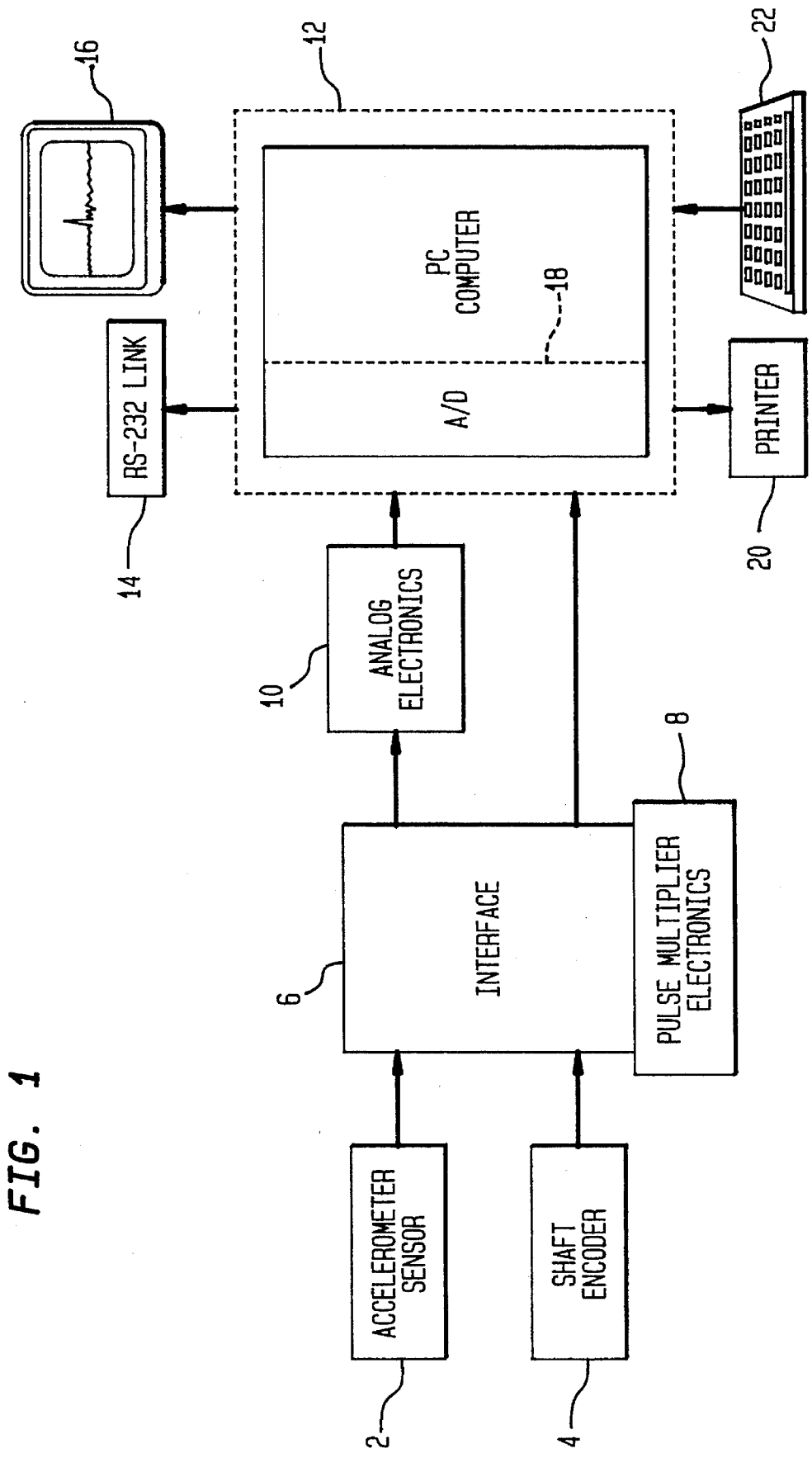
FIG. 1 is a block diagram of the preferred embodiment of the present invention.

The invention according to the preferred embodiment is illustrated in FIG. 1 by a block diagram. An accelerometer 2 senses vibration produced by a rotating machine. A shaft encoder 4 produces H' pulses per revolution of a machine component such as a shaft (hereafter referred to as a shaft). These signals are passed to the interface 6. Pulse multiplier electronics 8 increases or decreases the pulse rate to provide H pulses per shaft rotation which are sent to the computer 12. Analog electronics 10 provide signal conditioning for the accelerometer signal. The computer 12 receives these signals, processes and analyzes them, and communicates to peripherals, such as an RS-232 link 14, a CRT 16, a printer 20 or a keyboard 22. The computer contains an analog-to-digital processor 18 that converts the conditioned accelerometer signal to digital form. The external clock controlling the digitizer is provided by the encoder pulses.

Figure 2:
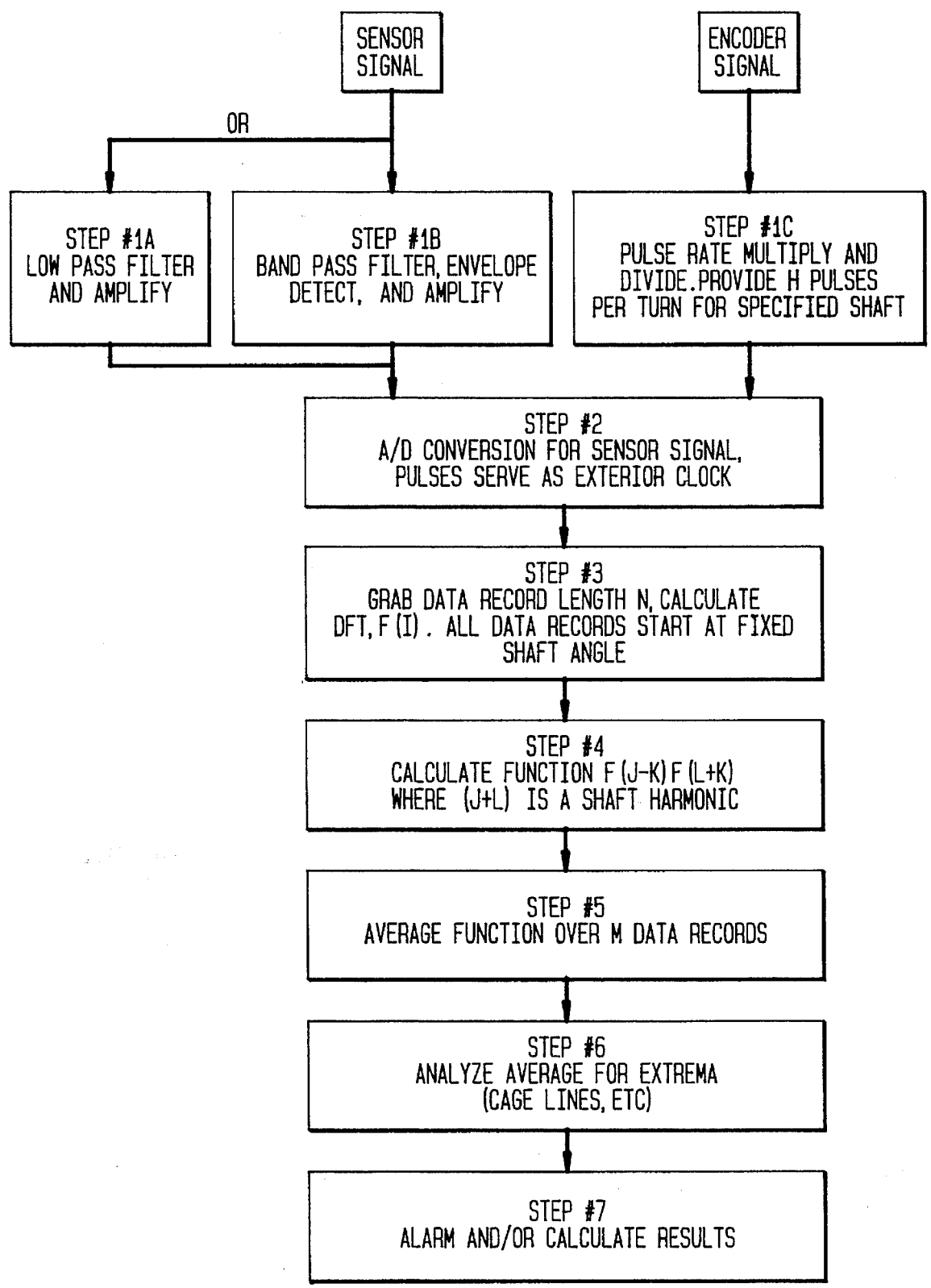
FIG. 2 is a flowchart of the steps by which the system analyzes signals for components that slip in rotating machines and detects machinery defects.

FIG. 2 illustrates a more detailed description of the steps in processing these signals and detecting faults. The first step in the preferred method comprises the detection and conditioning of the sensor and encoder signals. The sensor 2 that detects the vibration signal is an off-the-shelf, wideband piezoelectric accelerometer with a frequency range from the lowest frequencies of interest to 50 KHz or more. The sensor signal may be conditioned in several ways, two of which are illustrated in figure here. In step 1A, the signal is low-pass filtered (for anti-aliasing) and amplified for sufficient dynamic range before being digitized. Hereinafter, filtering solely by low pass is considered to produce baseband data. In the alternative conditioning step 1B, a particular frequency band of interest, e.g. the band 30–50 KHz, is extracted with a band-pass filter, envelope detected, low pass filtered and amplified, then sent to the digitizer. Hereinafter, filtering by bandpass shall be considered to produce bandpassed or high frequency data.

The encoder signal is provided by shaft encoder 4 which may consist of a mounted gear or other energy reflecting surface and a magnetic, optical or other pickup producing a pulse per increment of shaft rotation. For example, a gear with 60 teeth would produce pulses 6 degrees apart. In step 1C, the pulse rate may be multiplied or divided to provide H pulses per turn of the shaft, satisfying the Nyquist criterion on signal sampling rate.

In step 2, the conditioned vibration-sensor signal from either step 1A or 1B is digitized by an analog-to-digital converter 18 with the clock controlling sampling rate being provided by the pulses from stem 1C. Thus, exactly H digital samples of the sensor signal are produced for each rotation of the shaft of interest.

In step 3, the computer captures N samples of data to form a data record. The first sample in each record is taken such that it occurs at a fixed angular position of the shaft. The length of the data record typically is exactly an integral number of shaft turns T where N=HT. Next, a complex DFT, F(I), is calculated for the data record. The length of the data record determines the resolution of the spectrum. For example, for a record equivalent to 100 shaft turns and a shaft rotation rate of 30 Hz, the resolution is 30/100 Hz, or 0.3 Hz.

The number of samples in the record determines the number of discrete frequencies, called bins, for which the DFT is calculated, according to the formula N/2+1. For example, if N=6000, there are 3001 bins, or discrete frequencies at which spectrum values are calculated. Given that the sampling rate is controlled by shaft rotation rate (S), this technique is referred to as Order Analysis, with shaft orders (or harmonics) located at frequency bins T, 2T, 3T, etc.

Generation of 2-form Spectra G

In step 4 of the method, a new discrete spectral function G(J,K/L) is calculated. This function may take various forms depending on the application. Examples include F(J−K)F(L+K) and F(J−K)F*(K−L), where F* represents the complex conjugate. K is a positive integer less than J, representing the discrete frequencies, or bin values, for which G is formed. J and L are shaft-order bin values. The spectral function can take a number of forms, such as, for a shaft frequency of 100;

| | |
|---|---|
| F(K)F(100 − K), | F(100 + K)F(100 − K), |
| F(K)F(200 − K), | F(200 + k)F(200 − K), |
| F(K)F(300 − K), | F(100 + K)F(200 − K), |
| F(K)F(400 − K), | F(200 + K)F(300 − K), |
| F(K − 100)F*(K + 100), | F(K − 100)F*(K + 200) |

The product of the two spectral components produces two new spectral components with frequencies equal to the sum and difference respectively of the original components. We see also that the sum of the frequency components of each of the forms is equal to an integer multiple of T, the first shaft harmonic bin, i.e. 100, 200 or 300. Critical to the method, these summed components are synchronous with the shaft rotation and can be synchronously added and averaged.

In step 5 of the method, the spectral function G formed in this manner is averaged over M, typically a large number of, data records to produce the averaged function <G>. Frequency components of G corresponding to cage rotation frequency, C, or its harmonics, 2C, 3C, etc., and other synchronously related components, will have fixed phases relative to each other and will add constructively, whereas other components that are not of fixed phase relations will add destructively and tend towards zero.

In step 6, <G> is automatically examined for extrema in spectral bin regions where component lines are expected. For example, bearing cage lines typically occur at bins between 0.35 and 0.45 times the first shaft-order bin number. Extrema so detected are used to calculate the condition of the various components of interest.

Figure 3A:
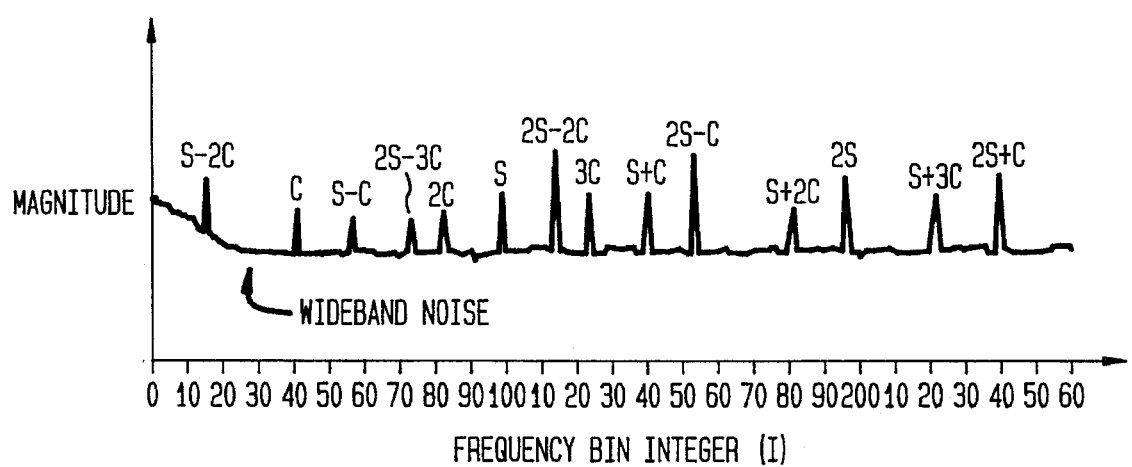
FIG. 3a is an idealized representation of a power spectrum <P(I)> illustrating where spectral lines might be expected to occur for a roller bearing with a worn rolling element, if the lines were not submerged in the background noise that traditional techniques do not suppress effectively.

FIG. 3a is an idealized representation of a power spectrum <P(I)> for a roller bearing with a worn rolling element, illustrating where spectral lines would appear, if they were not submerged in the background noise that plagues traditional spectral techniques. The data record length is 100 shaft turns. Spectral components at the bins representing the first and second shaft harmonics, 2S and 3S, the first, second and third harmonics of the cage frequencies, C, 2C and 3C, and various inter-modulations, S-2C, S-C, 2S-3C etc., are present. While shaft harmonics fall exactly on integer bins values, owing to the nature of the analysis, other components, such as C or S-2C, typically will not. The spectral energies of these components will tend to "leak over" into adjacent bins and appear as slightly broadened spectral components.

An important factor underlying the current invention is that the inter-modulation lines at bins S-2C, 2S-3C etc. are caused by non-linear interactions between the bearing cage and the shaft. The result is that the amplitudes-and phases of these interaction spectral elements are, for a given fixed bearing condition, directly determined by the amplitudes and phases of the bearing cage and shaft spectral components.

Figure 3B:
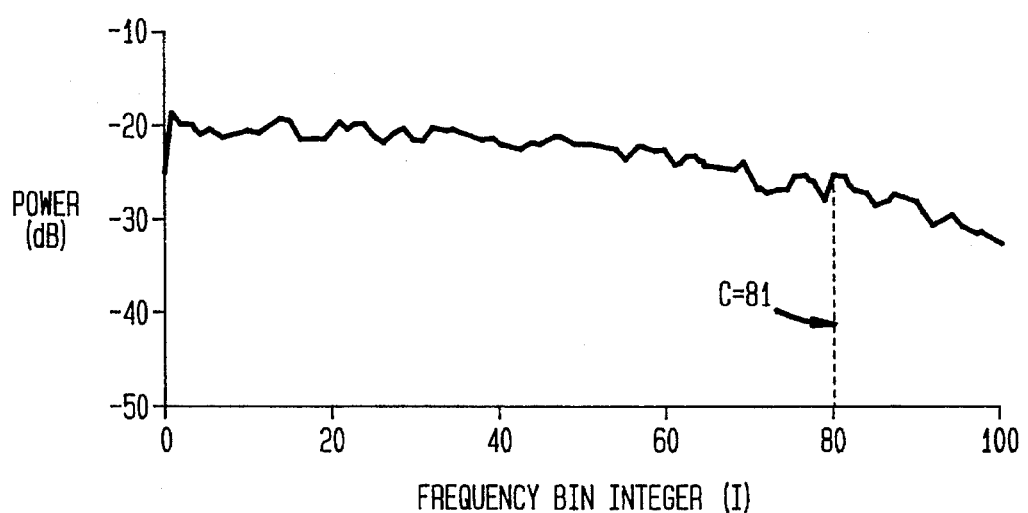
FIG. 3b is an actual power spectrum P(I) calculated for a rolling element bearing with a defective roller.

FIG. 3b is an actual power spectrum <P(I)> calculated for a for a rolling element bearing with a rolling element defect, which can also be considered a cage defect since the rolling element moves with the cage. As mentioned above, a spectral line representing the cage rotation frequency is expected between 0.35 and 0.45 times the shaft frequency, or between bins 70 and 90 in this case with S=200. Positive identification of the cage peak is not possible.

Figure 4A:
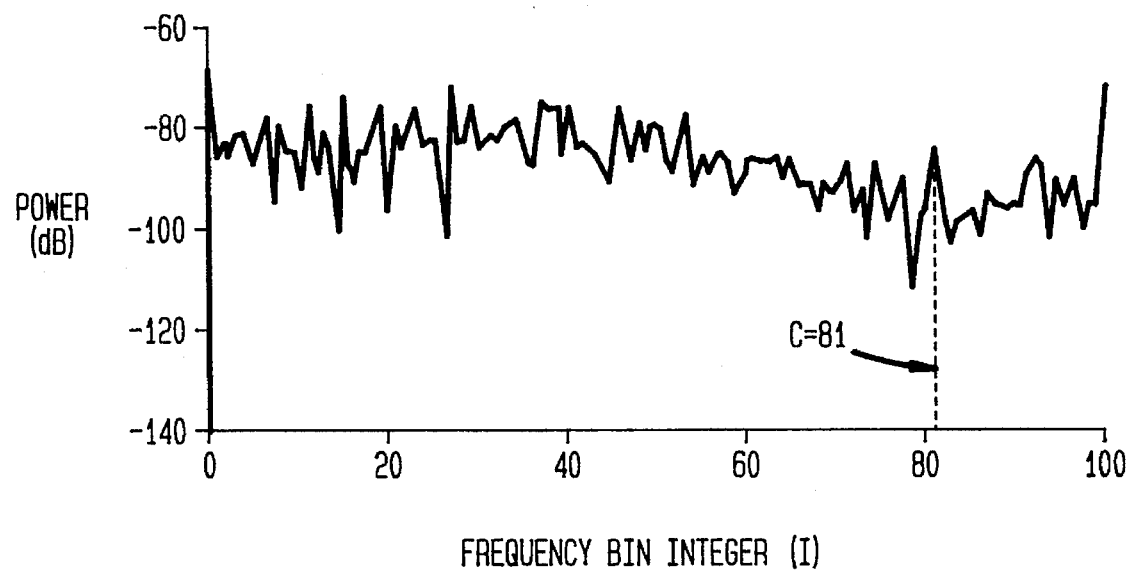
FIG. 4 shows an actual 2-form spectrum <G> for the roller bearing data used to form P(I) in FIG. 3b. The length of an individual data record is 200 shaft rotations. The number of records averaged in FIG. 4a is 112 records.
In FIG. 4b, the number of records averaged is 1053. Sensitivity is proportional to the square root of record number.
Figure 4B:
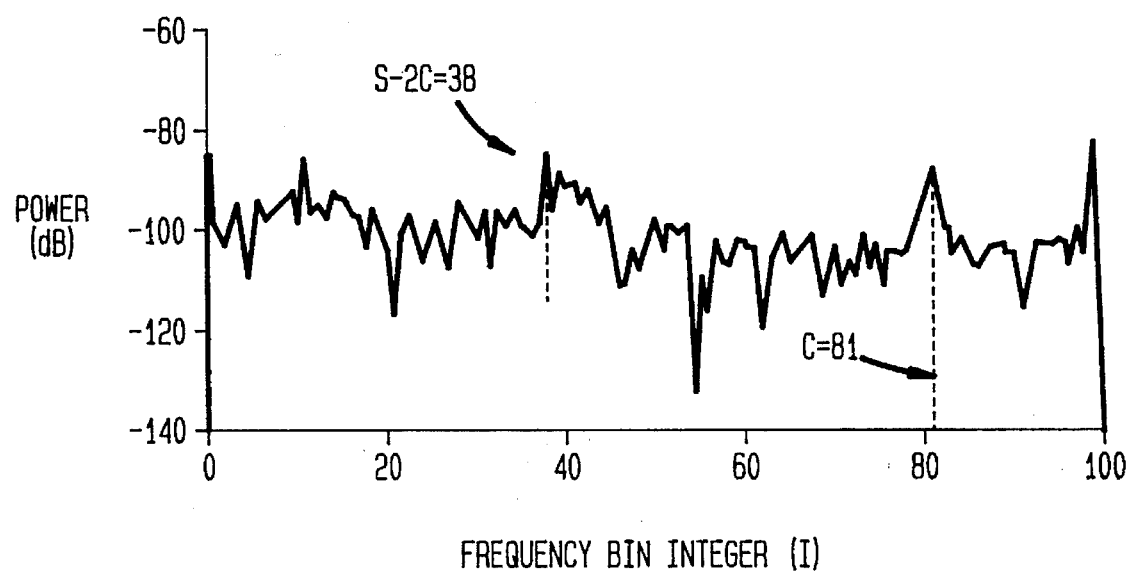

FIG. 4 shows examples of an actual 2-form spectrum <G> calculated with the data used to form <P(I)> in FIG. 3b. Record length is 200 shaft turns. <G(I)> is averaged over 112 records in 4a and 1053 records in 4b. In 4a, a peak is beginning to emerge at bin 81. In 4b, we see the line at bin 81 is clearly the cage line. A line is also emerging at bin 38, or S-2C. For larger number of records, the various shaft, cage and interaction lines will be more completely differentiated from background noise because sensitivity of this method is proportional to $M^{0.5}$.

G may also be calculated in higher order forms, for example for application to machines with more complex interactions. Here too, it is required that component frequencies add to a multiple of shaft frequency. In such higher order forms, lines representative of interactions, e.g. between the cages of the two bearings, are detectable. While higher order interaction lines are decreased in magnitude, they still can be useful in determining attributes of the machine.

Figure 5:
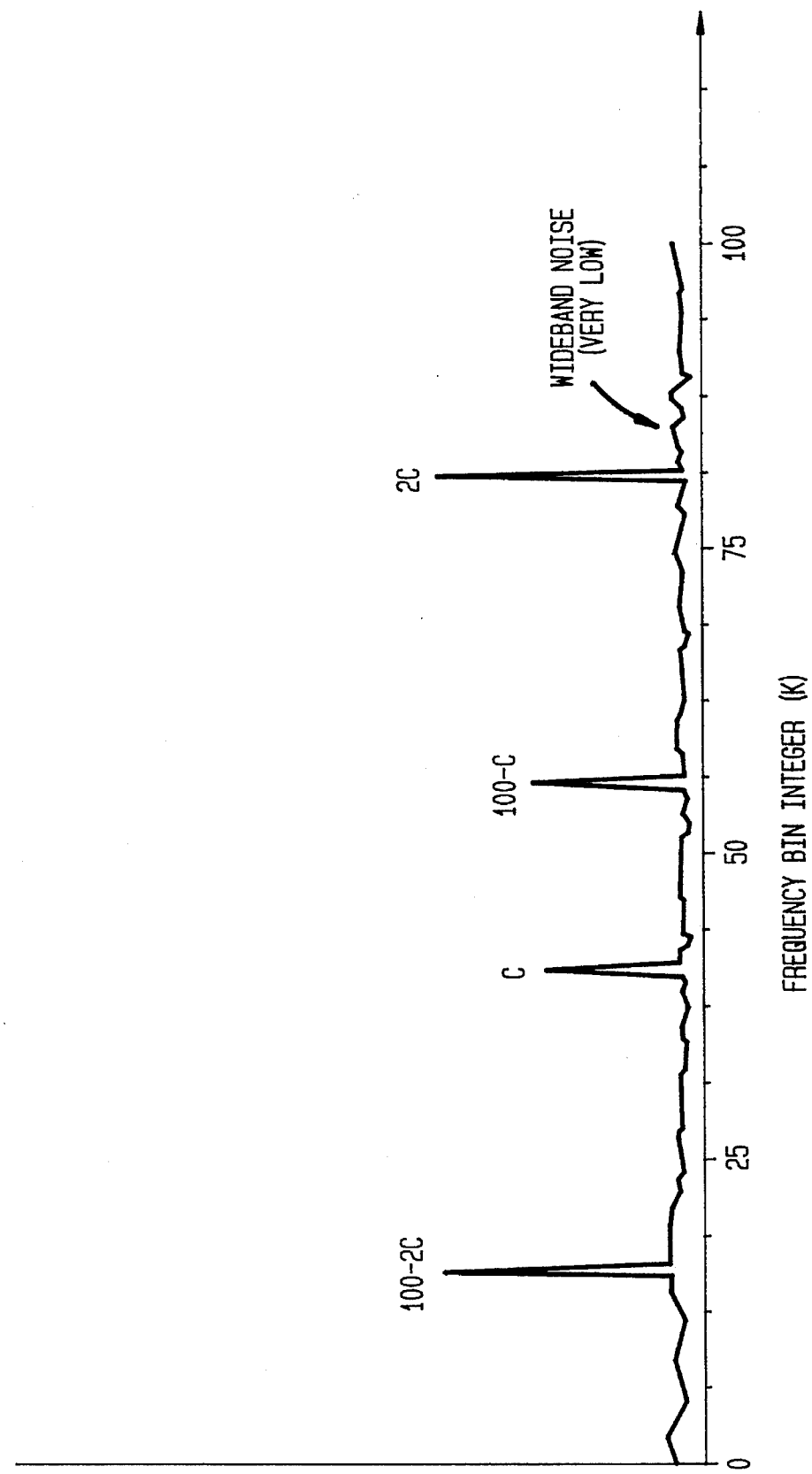
FIG. 5 is an idealized example of the averaged spectral function <G> where we have chosen the form F(100−K)F(K). The data record length is equal to 100 turns of the shaft, and J and L are set to 100 and 0 respectively. Averaged over many records, the background noise will tend to zero and the cage lines to converge on finite values, making them readily detectable.
Figure 6:
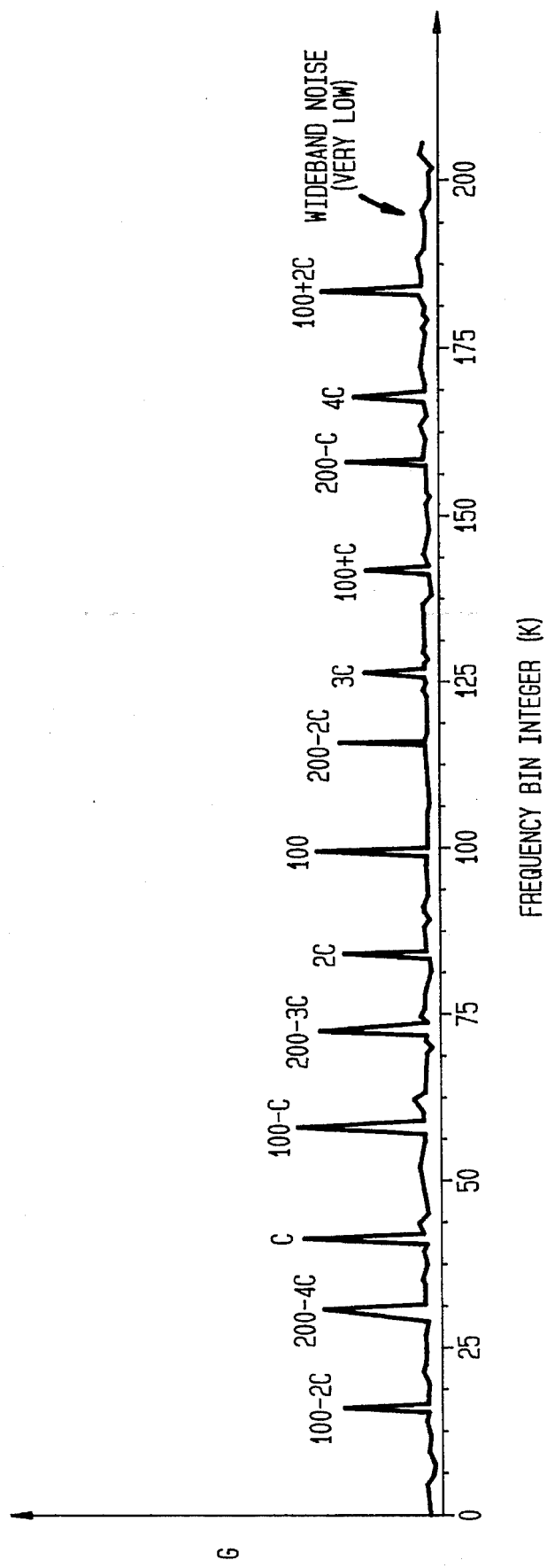
FIG. 6 is an idealized example of the averaged spectral function <G> where we have chosen the form F(200−K)F(100+K) and the data record length equal to 100 turns of the shaft. With this form more spectral peaks occur, some of which have been omitted here for clarity.

FIGS. 5 and 6 show idealized averaged functions, <G>, that might be expected for a bearing with an irregular or damaged roller, or damaged cage. In FIGS. 5 and 6 both, data record length is 100 shaft turns. In FIG. 5, J=100 and L=0. In FIG. 6, J=200 and L=100. (For the sake of clarity, FIG. 6 shows only some spectrum components.)

Alarm and Shutdown

In step 7 of the method, a decision is made regarding the relationship of the features or measures generated in step 6 to certain pre-set criteria. As appropriate, an alarm or other message is generated by the computer 12. Such analyses may include review of historical trends in the features or measures generated in steps 1–6.

Modifications

Other embodiments and variations of this invention are also contemplated.

In step 1, the sensor can be any device that detects signals generated by the bearing or other component of interest. Examples include: displacement or velocity sensors, microphones, or acoustic emission sensors.

Data records need not be subjected to pair-wise subtraction, to remove sensor signals that add coherently. The result is that the calculated spectra will retain components associated with such synchronously rotating components shafts and gears, which may be desired in certain applications.

Although desirable, the number of samples per shaft rotation, H, need not be an integer number. It is sufficient that it be a fixed number. This approach may be convenient when analyzing gearboxes since the encoder may supply an integral number of pulses for a given shaft but, in general, not for other shafts in the gear train. For example, take the meshing of an 11 tooth gear with a 30 tooth gear, with an encoder sensing H pulses per turn of the shaft bearing the 11 tooth gear. For the shaft carrying the 30 tooth gear, the number of pulses per turn is 30H/11, which may not be an integer. The analysis is indifferent to the number of pulses, so long as the data records are a fixed multiple of shaft rotations.

In step 3, it is desirable, but not required to use a data record length corresponding to an integral number of shaft turns. If records of another length are chosen, the shaft spectral lines may not fall exactly on spectral bins. In this case, when calculating G, bin values for J and L should be chosen close to shaft harmonic orders. While this approach sacrifices some sensitivity, it may be desirable when the need to generate FFT-type spectra restricts records to an integral power of two data points in length.

Although it is desirable, it is not imperative to begin each data record at the same angular orientation of the shaft or to employ an encoder to control digitizing. For example, a set of data records of arbitrary starting points relative to shaft angular position, forming $G=F(J-K)F(L+K)F^*(J+L)$, where $F^*$ is the complex conjugate of the spectral function, will enable coherent averaging of G. If an encoder is not used shaft spectral lines may be used to calculate a pulse train as an external clock for digitizing and sampling the signal.

The methods described above focus on detecting cage- or roller-related problems in roller bearings. The method of this invention can also be used to detect race-related problems in bearings. Outer-race and inner-race defects tend to produce vibrations at mC and m(S-C) respectively, where m is the number of roller elements. Thus can race defects be detected as in the method by steps 1–7 above. If defects are suspected in both races, J is set equal to mT and L=0. The sum of mC and m(S-C) is equal to mS, which is synchronous with shaft rotation and generates a spectral line in G or <G> at bin mS.

An interesting fact is that the outer race component of the spectra at bin mS tends to be present at some level in the baseband in all bearings. Therefore, to isolate vibrations from inner race defects, J and L are set to mT and 0 respectively. An alternative is to calculate G as $F(L+K)$ using baseband data with L=0, and $F(J-K)$ using enveloped high frequency data with J=mT. This technique requires the simultaneous digitizing of both high and low frequency data since the method requires simultaneous data record for both frequency bands.

Given that the outer race component, mC, tends to be universally present in the baseband, outer race defects may be detected in the enveloped high frequency data with a standard cross-spectral coherent calculation between the two signals and searching for a line peak in the region of bin mC. This is because both high and low frequency components are produced by the outer race and, therefore, coherent with each other.

Figure 7:
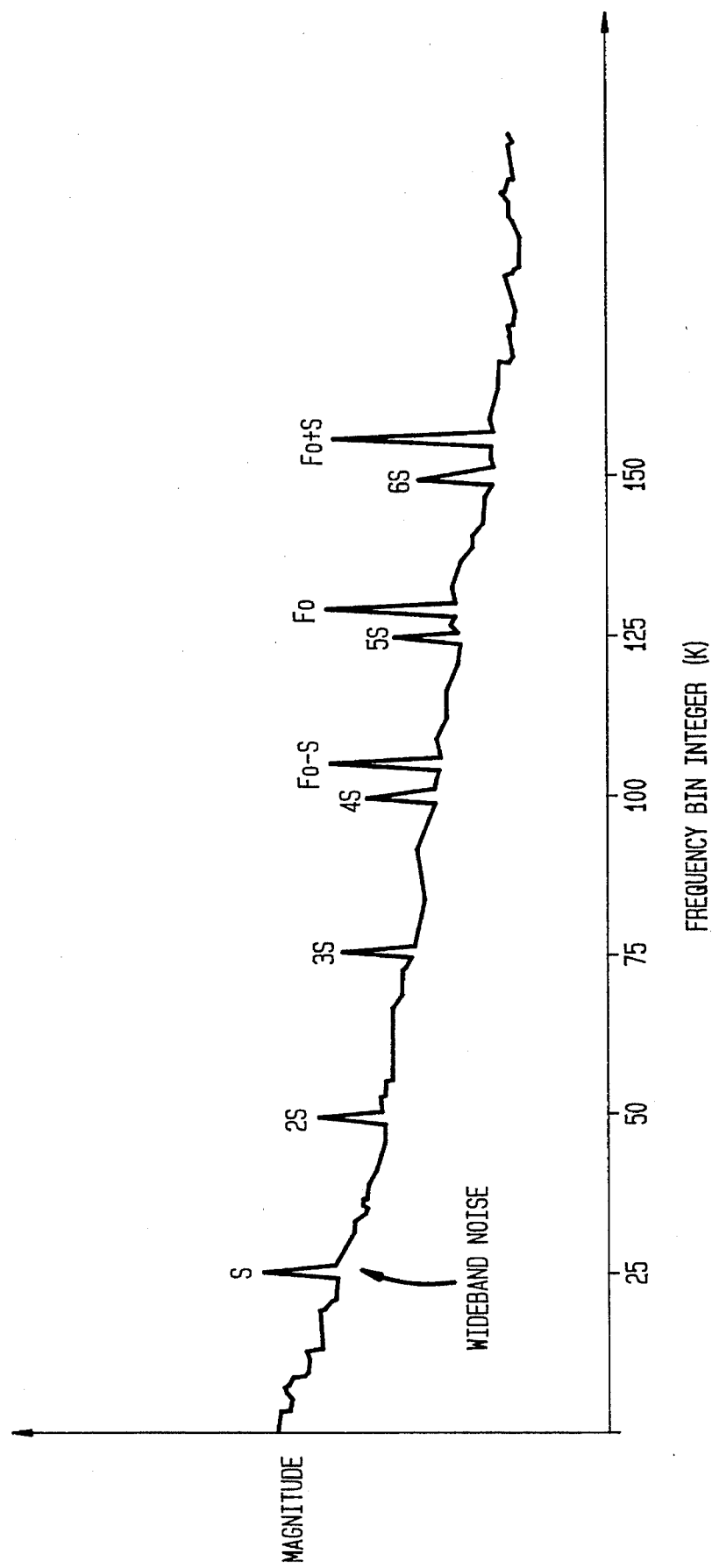
FIG. 7 is an idealized example of an averaged power spectral density function <P> for a rolling element bearing with a defective outer race. Spectral components are present at the outer-race ball passing frequency $F_o$ and shaft modulation components about the ball passing frequency at frequencies $F_0 \pm S$.

As a bearing defect develops, shaft frequency sidebands typically appear symmetrically about the defect frequency $F_0$. FIG. 7 demonstrates a means to exploit this in detecting defects. In this example,, the shaft frequency, S, is 25 Hz. The functional form of G is therefore $F(K-25)F^*(K+25)$.

Defective bearings also often produce an audible ringing at a resonance frequency, FR, which is modulated at the shaft rotation. The above functional form would also detect this signal when $K=F_R$.

Further variations on the preferred method outlined in FIG. 2 can be implemented. Instead of using the encoder signal to control the digitizer clock, one might simply use the computer's internal clock to control sampling of both the vibration signal and a once-per-turn component of the encoder signal. Such an encoder signal would contain very strong harmonics of the shaft rotation frequency. Once spectra are calculated for both the vibration and encoder signals, G can be generalized to the form $F(J-L)F(L+K)F^*(J+L)$, where $F^*$ is the complex conjugate of the encoder signal complex spectrum. This generalized function G is averaged as previously over a sufficient number of data records of fixed length but arbitrary starting point with respect to shaft angular orientation.

If shaft harmonic lines are of sufficient magnitude in the vibration signal, no encoder is needed. In the above form, F is replaced by F. While this is possible, limitations, such as a lack of discrimination of all shaft harmonics and the presence of noise in the vicinity of those harmonics, may make G converge slowly.

We might also note that variations on the described method can be used to determine certain characteristics of bearings with or without significant defects. All bearings have some irregularities, which create the baseband vibration seen in FIG. 3. Thus, the form $F(K)F(S-K)$ can be used to determine cage frequency. While peaks will tend to be smaller for non-defective bearings, averaging over more data records will distinguish the peaks from the background. Having determined the cage frequency, it is also possible to calculate the ratio of inner- to outer-race diameters from the ratio of the cage and shaft frequencies by well known formulae.

The number of rollers in a bearing can also be calculated, using the form $F(S)F(mS-K)$, where m is the number of rollers. The value of m generating the maximum value of G when K equals the outer-race ball-passing frequency represents the number of rollers in the bearing.

CONCLUSION

It is thus seen that defects in bearings and other slipping rotating elements of rotating machines can be detected and an early warning of impending failure provided by using the signal processing methods described hereinabove. While the invention has been described in connection with specific and preferred embodiments thereof, it is capable of further modifications without departing from the spirit and scope of the invention. In particular, while the examples given were in terms of roller bearings, the same procedures can be used for other slipping components that a user wishes to monitor. This application is intended to cover all variations, uses, or adaptations of the invention, following, in general, the principles of the invention and including such departures from the present disclosure as come within known or customary practice within the art to which the invention pertains, or as are obvious to persons skilled in the art, at the time the departure is made. It should be appreciated that the scope of this invention is not limited to the detailed description of the invention hereinabove, but rather comprehends the subject matter defined by the following claims.

I claim:

1. A method for analyzing an operating rotary machine having interacting components that slip, said interacting components comprising at least a first component rotating asynchronously with respect to a second component, said first component being an asynchronous component and said second component being a synchronous component comprising the steps of:

a. acquiring a machine signal from said rotary machine, said machine signal having a plurality of interaction elements generated by said interacting components;

b. conditioning said machine signal to produce a conditioned signal;

c. processing said conditioned signal by forming products of certain ones of said elements for providing a processed signal phase locked to said synchronous component;

d. averaging said processed signal over a plurality of data records to produce an averaged signal comprised of averaged signal elements; and e. analyzing said averaged signal elements for locating extrema of said averaged signal thereby determining attributes of said asynchronous component.

2. The method according to claim 1 wherein said machine signal is a vibration signal.

3. The method according to claim 1 wherein in step b said conditioning comprises the steps of:
   low pass filtering said machine signal for providing a filtered signal; and
   amplifying said filtered signal to produce a baseband.

4. The method of claim 1 wherein in step b said conditioning is performed by the steps of:
   bandpass filtering said machine signal for providing a filtered signal;
   envelope detecting said filtered signal for providing an enveloped signal; and
   amplifying said enveloped signal.

5. The method according to claim 1 wherein in step c said processing comprises:
   acquiring a rotation signal for said synchronous component.

6. The method according to claim 5 wherein said rotation signal is acquired by a shaft angle encoder.

7. The method according to claim 5 wherein said rotation signal is formed by filtering a sensed signal from said rotary machine to produce a specific harmonic of said synchronous component for forming said rotation signal.

8. The method according to claim 5 wherein in said step c said processing comprises the steps of:
   modifying said rotation signal to form a plurality of pulses, said plurality of pulses forming a pulse train;
   digitizing said conditioned signal at a rate controlled by said pulse train to produce a digitized signal, said digitized signal having a plurality of digital signal elements;
   forming strings of said digital signal elements having a fixed length, said strings being separated in time by an integer multiple of a machinery cycle period;
   enhancing said digitized signal by pair-wise subtraction of successive said strings to form a string of enhanced digital signal elements;
   forming data records of fixed length by capturing a fixed number of said enhanced digital signal elements with each of said data records initialized at a fixed point with respect to the angular orientation of said synchronous component;
   performing Discrete Fourier Transformations (DFT) and DFT conjugates (DFT*) on said data records; and
   forming products of a plurality of spectral elements of said DFT and said DFT* such that a sum of the respective frequencies of said spectral elements is equal to a harmonic of said synchronous component.

9. The method according to claim 5 wherein in said step c said processing comprises the steps of:
   digitizing said conditioned signal and said rotation signal under control of an internal clock;
   forming data records of equal length for said conditioned signal and said rotation signal;
   performing Discrete Fourier Transformations (DFT) and DFT conjugates (DFT*) on each of said data records; and
   forming products of a plurality of spectral elements of said DFT and said DFT* for each of said data records such that the sum of the respective frequencies of said spectral elements is equal to zero.

10. The method according to claim 1 wherein in said step c said processing comprises the steps of:
    digitizing said conditioned signal under control of an internal clock;
    forming said data records of said conditioned signal of equal length;
    performing Discrete Fourier Transformations (DFT) and DFT conjugates (DFT*) for each of said data records; and
    forming products of a plurality of spectral elements of said DFT and DFT* such that the sum of the elements is zero.

11. The method according to claim 1 further comprising the step of triggering an alarm with said attributes.

12. A method for analyzing a machinery signal X(t) generated by machinery in which a component A is physically associated with at least one rotating component B, comprising the steps of:
    a. sensing said machinery signal X(t), where t represents time, containing signal components generated by said components A and B;
    b. performing signal conditioning on said machine signal X(t);
    c. obtaining a signal Y(t) formed of a pulse train with a fixed number of pulses per rotation of said component B;
    d. digitizing said machinery signal X(t) where said pulses comprising signal Y(t) are used as an external clock to control digitizing;
    e. enhancing said machinery signal X(t) to form signal X'(t);
    f. forming equal length data records by sampling from said signal X'(t), said data records being initialized at a fixed angular orientation of said rotating component B;
    g. performing a Discrete Fourier Transform (DFT) on each said data records, giving rise to a series of complex components of said DFT;
    h. forming for said DFT a spectral function G from the products of pairs of said complex components of said DFT or its complex conjugates such that the sum or difference of the respective frequencies of said complex components is constant and equal to some harmonic of the rotation frequency of said component B;
    i. averaging said spectral function G over M data records to form an averaged function <G>;
    j. analyzing said averaged function <G> to determine attributes of said component A.

13. The method according to claim 12 in which said signal generated by said machinery is a vibration signal.

14. The method of claim 12 in which said sampling is in the baseband range of frequencies.

15. The method of claim 12 in which the sampling is in the bandpassed range of frequencies.

16. The method according to claim 12 wherein said rotating component B is a shaft with a given rotating frequency in which in said step b said conditioning includes low pass filtering and amplifying said signal X'(t).

17. The method according to claim 12 wherein said rotating component B is a shaft with a given rotating frequency in which in said step b said conditioning includes low pass filtering and amplifying said signal X'(t) and/or bandpass filtering, envelope detecting and amplifying said signal X'(t).

18. The method according to claim 12 in which in said step c said fixed number of pulses is obtained by a shaft signal encoder.

19. The method of claim 12 in which step c said fixed number of pulses is obtained by detecting a rotational spectral line of said rotating machine and conditioning said spectral line to produce said fixed number of pulses.

20. The method of claim 12 in which in said step c said pulse train Y(t) consists of an integer number of pulses per said rotation of component B.

21. The method according to claim 12 in which in said step d said enhancing is performed by subtraction of said signal X(t) for consecutive cycles of the machine.

22. The method according to claim 12 in which in said step e said enhancing comprises a pass through of the data.

23. The method according to claim 12 in which in said step f said record length shall be an integer multiple of said rotation of said component B.

24. The method according to claim 12 in which in step j said analysis of said attributes is used to generate an alarm or message on the condition of said machinery.

25. A method for analyzing a machinery signal X(t) generated by machinery in which component A is physically associated with at least one rotating component B, comprising the steps of:

a. sensing said machinery signal X(t), where t represents time, containing signal components generated by said components A and B;

b. performing signal conditioning on said signal X(t);

c. digitizing said signal X(t), forming data records of equal length, performing DFT analysis of said data records to form a DFT and forming a spectrum G by multiplication of pairs of complex components of said DFT or its complex conjugates such that a sum or difference of representative frequencies of said pairs of complex components is a constant and approximately equal to a specific harmonic of a frequency of rotation of said component B;

d. obtaining a DFT signal component for a specific harmonic of said frequency of rotation of said machine component B, calculating a complex conjugate of a complex component of said DFT component for said specific harmonic and multiplying by spectrum function G to obtain a function $G^o$;

e. averaging said function $G^o$ over M of said data records to form an averaged function $<G^o>$;

f. analyzing said averaged function $<G^o>$ for attributes of said rotating component B.

26. The method according to claim 25 wherein said signals X(t) are vibration signals.

27. The method according to claim 26 wherein in step b said conditioning comprises low pass filtering and amplifying said machinery signal X(t).

28. The method according to claim 26 wherein in step b said conditioning comprises bandpass filtering, envelope detecting and amplifying said machinery signal X(t).

29. The method according to claim 26 in which said pairs of said components to be multiplied in forming said function G are formed of a first and second complex component, chosen such that said first component is produced by low pass filtering and said second component is produced from bandpassed enveloped data, or both said first and second components are produced from baseband frequency data or both said first and second components are produced from said bandpassed frequency data.

30. The method according to claim 26 in which said attributes in step f are used to generate a message on the operating condition of said machinery.

31. The method according to claim 25 in which said DFT signal component for said specific harmonic of said frequency component of said component B is obtained from a DFT of a baseband of said signal X(t).

32. The method according to claim 25 in which said DFT signal component is obtained from a DFT of an encoder signal Y(t), said signal Y(t) is obtained from an encoder mounted on said component B or said signal Y(t) is obtained from an encoder mounted elsewhere on said machinery.

33. A device for analyzing signals from a rotating or cyclic machine in which a first component of said machine has a frequency of rotation and is physically associated with at least one rotating second component, said device comprising:

a sensor coupled to said machine;

an interface connected to said sensor;

conditioning means connected to said interface for conditioning said signal to produce a conditioned signal;

digitizing means for digitizing said conditioned signal;

pulsed signal means for controlling said digitizing means to produce a fixed number of digitized samples per turn of said second component;

computer means for capturing fixed length data records, said records comprised of a constant number of said digitized samples in which the first said digitized sample of each of said fixed length data records occurs at a fixed angular orientation of said second component, and performing a Discrete Fourier Transformation (DFT) analysis of said data records;

forming a spectrum function G by multiplying pairs of components of said DFT or DFT complex conjugates to produce multiplied pairs such that the sum or difference of the respective frequencies of each of said multiplied pairs is a constant and approximately equal to a specific harmonic of said frequency of rotation of said second component;

means for averaging said multiplied pairs over predetermined ones of said data records;

means for analyzing said spectrum function G for attributes; and output means for displaying the results of said analysis.

34. The device according to claim 33 further comprising:

a shaft angle encoder connected to said machine, said shaft angle encoder producing a fixed number of pulses of said signal for each rotation of said second component; and pulse multiplier means to change the pulse rate from said encoder to an optimized rate.

35. The device according to claim 33 wherein said output means comprises a CRT monitor.

36. The device according to claim 35 wherein said output means further comprises an alarm indicating when said attributes of said signals meet predetermined criteria.

37. The device according to claim 33 wherein said sensor is a vibration sensor.

38. The device according to claim 33 wherein said computer means performs said DFT analysis on said fixed length data records and multiplies said pairs of DFT components, obtains a DFT signal component for a specific harmonic of the complex conjugate of said second component and multiplies said multiplied pair by said component of said complex conjugate to form a 3-form G(I), and averages said 3-form G(I) over a predetermined number of said data records to form $<G(I)>$ and analyzes said function for attributes of interest.

39. A method for analyzing an operating rotary machine having interacting components, said interacting components comprising at least a first component rotating asynchronously with respect to a second component, said first component being an asynchronous component and said second component being a synchronous component comprising the steps of:

a. acquiring a machine signal from said rotary machine, said machine signal having a plurality of interaction elements generated by said interacting components;

b. conditioning said machine signal to produce a conditioned signal;

c. processing said conditioned signal by forming products of certain ones of said signal elements for providing a processed signal phase locked to said synchronous component;

d. averaging said processed signal over a plurality of data records to produce an averaged signal comprised of averaged signal elements; and e. analyzing said averaged signal elements for locating extrema of said averaged signal thereby determining attributes of said asynchronous component;

wherein the frequency locations of certain of said attributes are used to calculate other attributes of said asynchronous components, said attributes including relative diameters of bearing components and the number of elements in a rolling element bearing.

40. A method for analyzing a machinery signal X(t) generated by machinery in which a component A is physically associated with at least one rotating component B, comprising the steps of:

a. sensing said machinery signal X(t), where t represents time, containing signal components generated by said components A and B;

be performing signal conditioning on said machine signal X(t);

c. obtaining a signal Y(t) formed of a pulse train with a fixed number of pulses per rotation of said component B;

d. digitizing said machinery signal X(t) where said pulses comprising signal Y(t) are used as an external clock to control digitizing;

e. enhancing said machinery signal X(t) to form signal X'(t);

f. forming equal length data records by sampling from said signal X'(t);

g. performing a Discrete Fourier Transform (DFT) on each said data records, giving rise to a series of complex components of said DFT;

h. forming for said DFT a spectral function G from the products of pairs of said complex components of said DFT or its complex conjugates such that the sum or difference of the respective frequencies of said complex components is constant and equal to some harmonic of the rotation frequency of said component B and the phase of the products of pairs is constant and independent of the initial angular orientation of said rotating component B;

i. averaging said spectral function G over M data records to form an averaged function <G>;

j. analyzing said averaged function <G> to determine attributes of said component A;

wherein in said step f, said data records do not begin at said fixed angular orientation of said rotating component B.

41. A method for analyzing a machinery signal X(t) generated by machinery in which a component A is physically associated with at least one rotating component B, comprising the steps of:

a. sensing said machinery signal X(t), where t represents time, containing signal components generated by said components A and B;

performing signal conditioning on said machine signal X(t);

c. obtaining a signal Y(t) formed of a pulse train with a fixed number of pulses per rotation of said component B;

d. digitizing said machinery signal X(t) where said pulses comprising signal Y(t) are used as an external clock to control digitizing;

e. enhancing said machinery signal X(t) to form signal X'(t);

f. forming equal length data records by sampling from said signal X'(t), said data records being initialized at a fixed angular orientation of said rotating component B;

g. performing a Discrete Fourier Transform (DFT) on each said data records, giving rise to a series of complex components of said DFT;

h. forming for said DFT a spectral function G from the products of pairs of said complex components of said DFT or its complex conjugates such that the sum or difference of the respective frequencies of said complex components is constant and equal to some harmonic of the rotation frequency of said component B;

i. averaging said spectral function G over M data records to form an averaged function <G>;

j. analyzing said averaged function <G> to determine attributes of said component A;

wherein in said step h said pairs of said components to be multiplied in forming said function G are complex and are formed of a first and second complex component, said first complex component is produced from said baseband range of frequencies and said second complex component is produced from said bandpassed range of frequencies or both said first and second complex components are produced from said range of baseband frequencies or both said first and second complex components are produced from said range of bandpassed frequencies.

42. A method for analyzing a machinery signal X(t) generated by machinery in which a component A is physically associated with at least one rotating component B, comprising the steps of:

a. sensing said machinery signal X(t), where t represents time, containing signal components generated by said components A and B;

b. performing signal conditioning on said machine signal X(t);

c. obtaining a signal Y(t) formed of a pulse train with a fixed number of pulses per rotation of said component B;

d. digitizing said machinery signal X(t) where said pulses comprising signal Y(t) are used as an external clock to control digitizing;

e. enhancing said machinery signal X(t) to form signal X'(t);

f. forming equal length data records by sampling from said signal X'(t), said data records being initialized at a fixed angular orientation of said rotating component B;

g. performing a Discrete Fourier Transform (DFT) on each said data records, giving rise to a series of complex components of said DFT;

h. forming for said DFT a spectral function G from the products of pairs of said complex components of said DFT or its complex conjugates such that the sum or difference of the respective frequencies of said complex components is constant and equal to some harmonic of the rotation frequency of said component B;

i. averaging said spectral function G over M data records to form an averaged function <G>;

j. analyzing said averaged function <G> to determine attributes of said component A;

in which said component A is a rolling element bearing and the frequency locations of said attributes in step j are used to calculate the geometric ratio of the race diameters or the relative magnitudes of said attributes are used to determine the number of rolling elements in said rolling element bearing.

43. A method for analyzing a machinery signal X(t) generated by machinery in which component A is physically associated with at least one rotating component B, comprising the steps of:

a. sensing said machinery signal X(t), where t represents time, containing signal components generated by said components A and B;

b. performing signal conditioning on said signal X(t);

c. digitizing said signal X(t), forming data records of equal length, performing DFT analysis of said data records to form a DFT and forming a spectrum G by multiplication of pairs of complex components of said DFT or its complex conjugates such that a sum or difference of representative frequencies of said pairs of complex components is a constant and approximately equal to a specific harmonic of a frequency of rotation of said component B;

d. obtaining a DFT signal component for a specific harmonic of said frequency of rotation of said machine component B, calculating a complex conjugate of a complex component of said DFT component for said specific harmonic and multiplying by spectrum function G to obtain a function $G^o$;

e. averaging said function $G^o$ over M of said data records to form an averaged function $<G^o>$;

f. analyzing said averaged function $<G^o>$ for attributes of said rotating component B;

wherein said component A is a rolling element bearing and frequency locations of said attributes of said function G are used to calculate the geometric ratio of the inner and outer race diameters or the relative magnitudes of said attributes are used to determine the number of rolling elements in said bearing.

* * * * *